United States Patent [19]

Azizi et al.

[11] Patent Number: 4,587,703

[45] Date of Patent: May 13, 1986

[54] METHOD AND APPARATUS USING A MULTIFACETED TURRET FOR ROBOTIC ASSEMBLY

[75] Inventors: Sohiel Azizi, Irvine; William Swan, Fullerton, both of Calif.

[73] Assignee: Apple Computer, Inc., Garden Grove, Calif.

[21] Appl. No.: 692,647

[22] Filed: Jan. 16, 1985

[51] Int. Cl.[4] .................. B23P 11/00; B23P 21/00; B65G 47/26; B25J 15/06
[52] U.S. Cl. ........................................ 29/431; 29/559; 29/703; 29/743; 29/785; 29/786; 29/790; 29/822; 29/DIG. 44; 198/419; 198/420; 269/21; 279/3; 414/225; 414/744 B; 414/737; 414/786; 901/7; 901/30; 901/40
[58] Field of Search ............... 29/431, 525, 559, 703, 29/743, 785, 786, 790, 822, DIG. 44, DIG. 78; 198/419, 420; 279/3; 269/21; 414/224, 225, 744 A, 744 B, 786, 737; 901/7, 30, 39, 40, 50; 51/235; 248/362, 363

[56] References Cited

U.S. PATENT DOCUMENTS

| | | | |
|---|---|---|---|
| 2,531,402 | 11/1950 | Cooper et al. | 29/743 X |
| 2,915,201 | 12/1959 | Calehuff et al. | 29/822 X |
| 3,158,381 | 11/1964 | Yamamura | 279/3 |
| 3,198,311 | 8/1965 | Lajoie | 414/744 B |
| 3,506,140 | 4/1970 | Koch et al. | 414/737 X |
| 3,718,246 | 2/1973 | Dardaine et al. | 198/419 |
| 3,930,295 | 1/1976 | Rose | 269/21 X |
| 3,945,879 | 3/1976 | Fletcher et al. | 269/21 X |
| 4,372,802 | 2/1983 | Harigane et al. | 29/743 X |
| 4,393,579 | 7/1983 | Van Hooreweder | 29/743 X |

OTHER PUBLICATIONS

Hoebener, K. G., "Multiple Size Chip Pickup, Orientation and Placement Station", IBM Technical Disclosure Bulletin, vol. 22, No. 7 (Dec. 1979); pp. 2757-2761.

*Primary Examiner*—Howard N. Goldberg
*Assistant Examiner*—R. Wallace
*Attorney, Agent, or Firm*—George F. Bethel; Patience K. Bethel

[57] ABSTRACT

The robotic assembly of a keyboard using a multiplicity of keys of a plurality of distinct types, such As key caps on a sculptured keyboard, can be substantially increased in speed by the use of a multifacted rotatable turret for picking up and installing the key caps onto the keyboard. A programmable robot, having a robotic arm is provided with a rotatable multifaceted turret. Each facet of the turret includes a key handling member which is molded to accept a distinct type of sculptured key. The types of sculptured keys are segregated in a pick-up position. The turret is manipulated by the robotic arm in the pick-up position to pick up a multiplicity of keys of one given type on each of the facets of the turret. Thus, each turret picks up one type of keys. The turret is then translated by the robotic arm to an assembly position. The turret is once again rotated and advanced to assemble the key caps on to key stem projected from the keyboard. Each facet is oriented in advance to install the type of key cap corresponding to that facet. Typically each row of keys is characterized by a distinct type of sculptured key cap. Thus, a separate facet is rotated in position to install each row of keys. Significantly, during the entire robotic assembly of a keyboard, the robotic arms make only one trip between the pick-up position and assembly positions regardless of the number of keys installed or the number of types of keys installed on the keyboard. This serves to substantially reduce the robotic assembly time.

20 Claims, 7 Drawing Figures

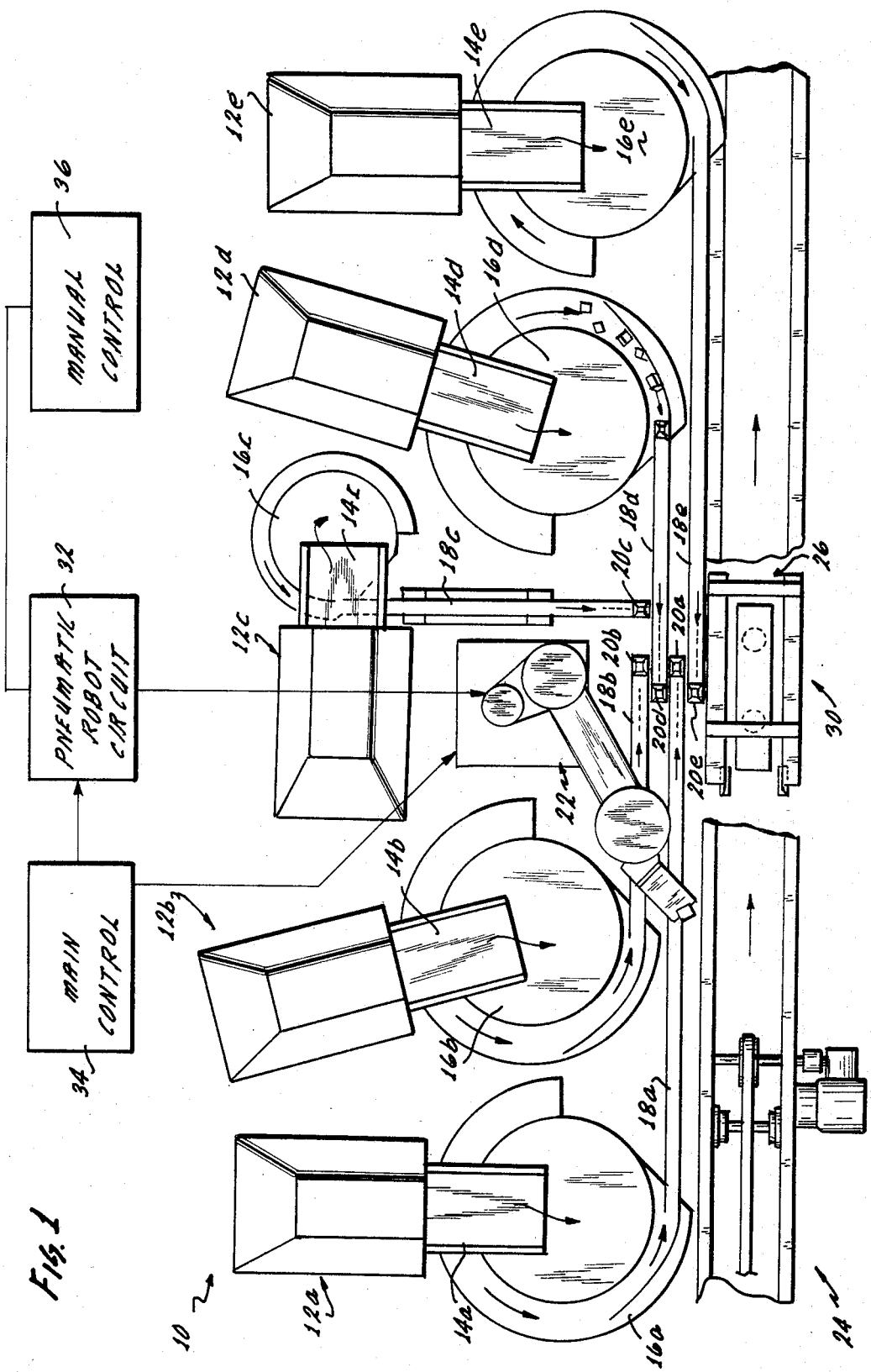

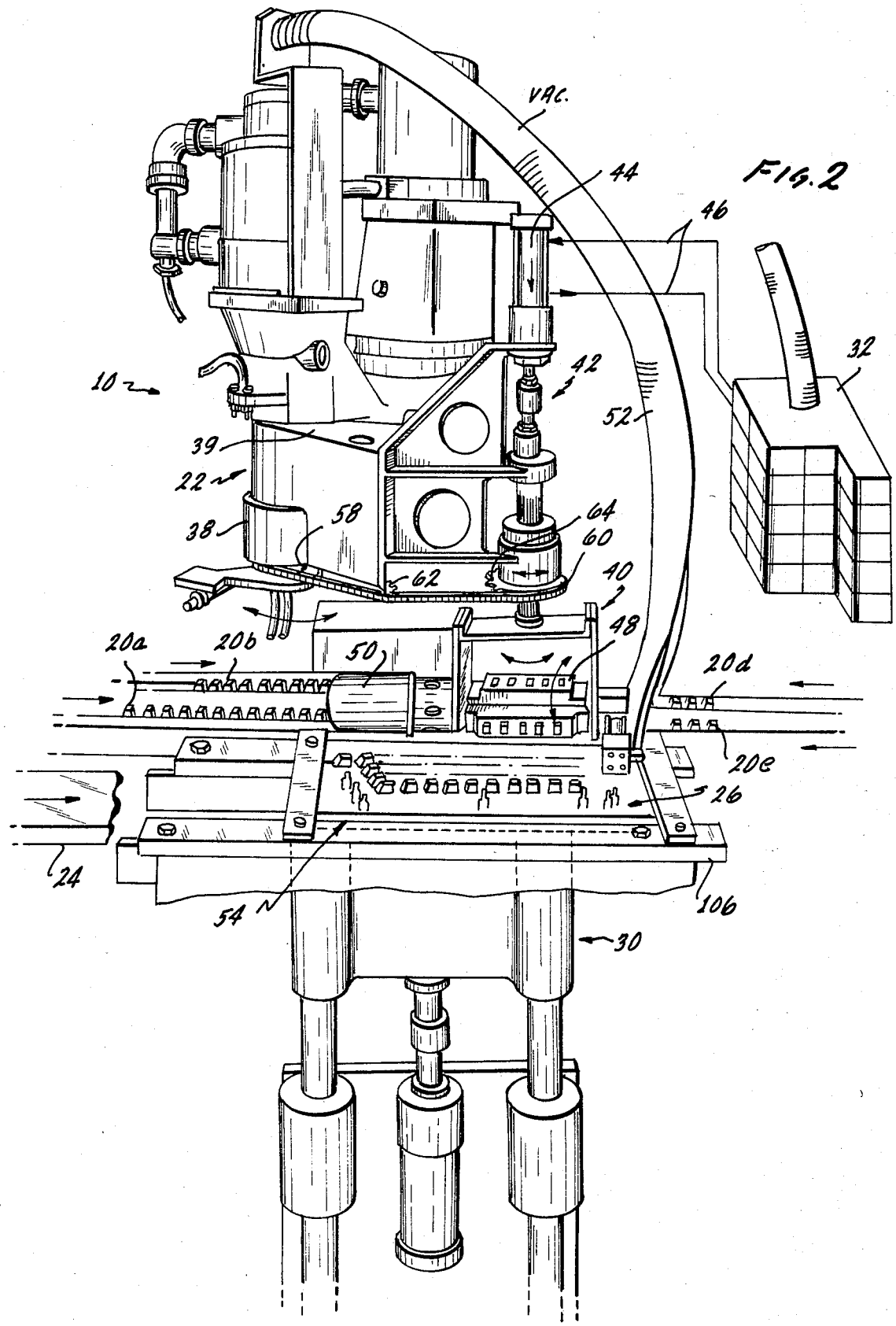

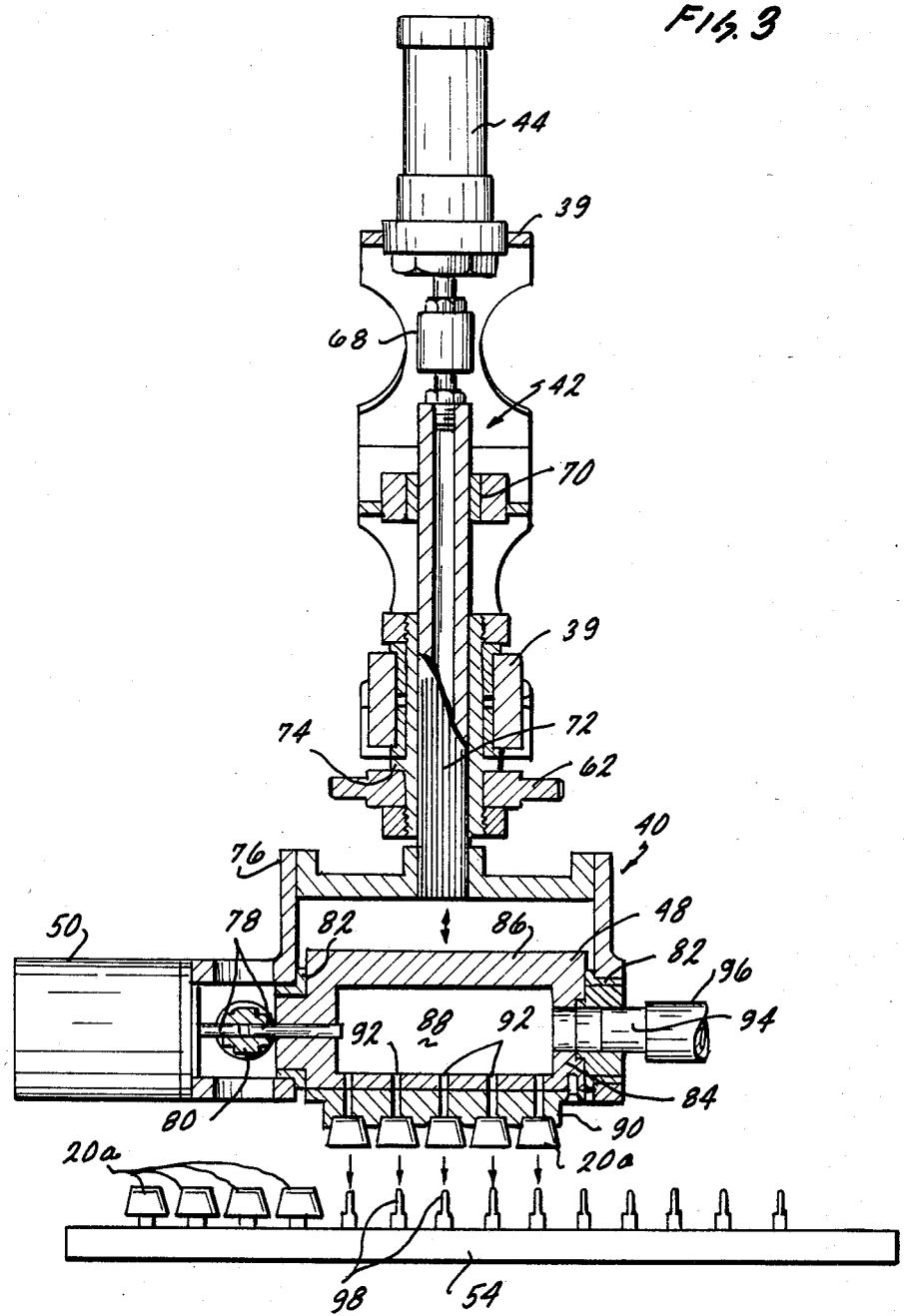

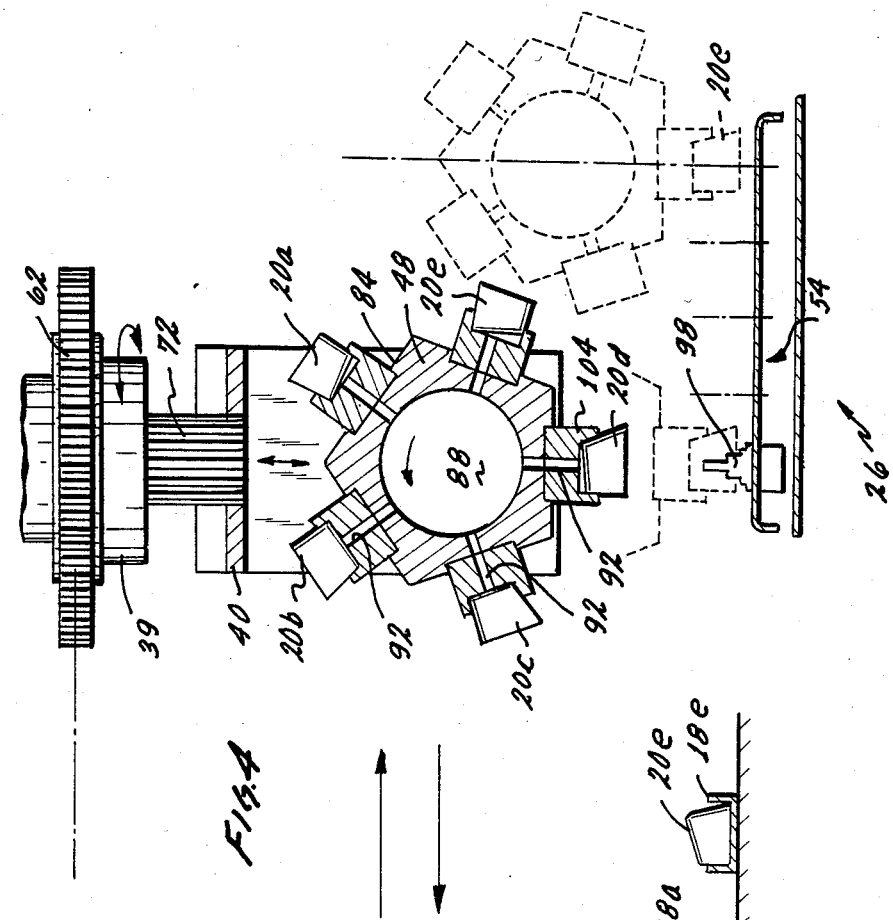
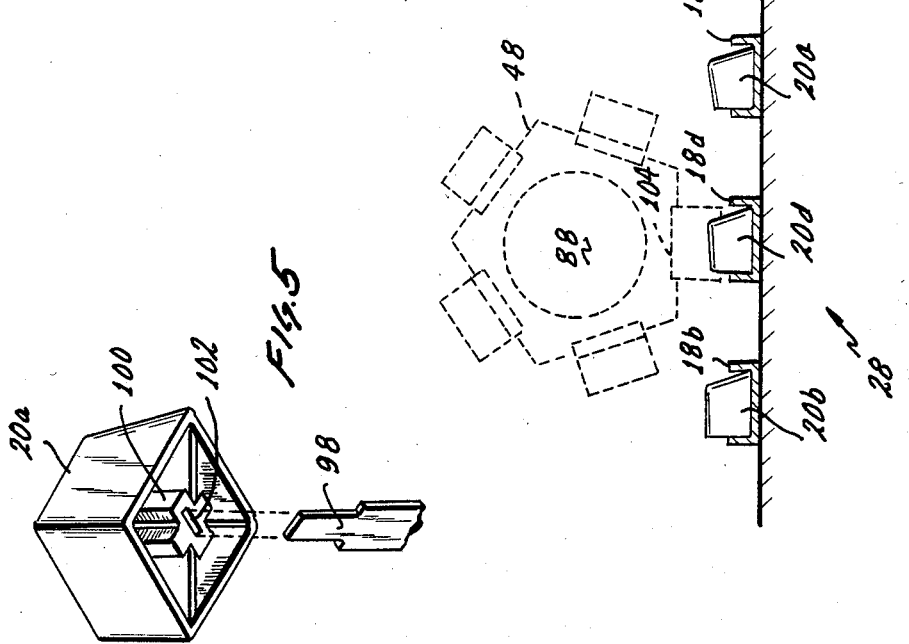

METHOD AND APPARATUS USING A MULTIFACETED TURRET FOR ROBOTIC ASSEMBLY

BACKGROUND OF THE INVENTION

1. Field of the Invention

The Invention relates to the field of robotics and more particularly to the manipulating head of a robot for handling key cap insertion into a keyboard.

2. Description of the Prior Art

Robotics have been widely used for assembly tasks, including those tasks where a high degree of precision is required for successful assembly. Such tasks in the prior art have included the assembly of computer keyboards. However, keyboards and in particular computer keyboards, are characterized by a plurality of different types of keys. For example, function keys, control keys, space bars, number pads and the like necessarily entail the use of different sizes and shapes of keys. The robot or robots which handle the keys must in each case be adapted to handle the specifically shaped and sized key and to correctly assemble it on the key stems. The problem becomes particularly exacerbated in the case of contoured keyboards which are frequently used for computer keyboards. The keys of a contoured keyboard collectively present a curved rather than a flat surface in order to facilitate user manipulation. Typically in a contoured keyboard, each row of keys and in some cases conceivably columns of keys, may incorporate key caps having differing profiles. In each case where the profile of the key cap changes, the manipulating arm of the robot must likewise be adapted and configured to pick up and insert the differently sized or shaped key cap.

Therefore, the prior art has devised robotic assembly lines wherein a plurality of robots are serially positioned in an assembly line and each robot is particularly specialized to handle a key cap of a predetermined size and shape. The number of robots required multiplies the capital expenditure necessary to build a robotic assembly line, increases the probability of breakdown, and lengthens assembly time.

What is needed then is a robotic system arranged and configured to assemble keyboards incorporating keys of differing sizes and shapes or contours which is not subject to the foregoing limitations of prior art robotic assemblies.

BRIEF SUMMARY OF THE INVENTION

The invention is a robotic system for assembling a multiplicity of parts. The multiplicity of parts are characterized by a plurality of distinct types. The parts are disposed in a pick-up position and assembled in an assembly position spaced apart from the pick-up position. The system comprises: a programmable robot with an arm; a multifaceted turret with each facet of the turret arranged and configured to manipulate at least one of the plurality of the types of parts; a mechanism for rotating the turret to selectively orient one of the facets of the turret in a predetermined orientation; a mechanism for vertically moving the turret; and a control mechanism coupled to the robotic arm, to the mechanism for rotating and to the mechanism for moving for controlling each according to a predetermined program. By reason of this combination of elements the system is capable of assembling a multiplicity of parts of a plurality of types while moving the turret only once between the pick-up position where the parts are picked up and the assembly position where the parts are assembled.

In particular the multiplicity of parts are sculptured key caps and each facet of the turret is arranged and configured to manipulate one type of sculptured key cap.

Alternatively the invention is an improvement in a robotics system for assembling a multiplicity of parts. The multiplicity of parts are characterized by a plurality of types. The robotic system includes a corresponding plurality of part hoppers for arranging the multiplicity of parts of each type in a pick-up position in a predetermined orientation. A conveyor mechanism transports and selectively retains a workpiece to which the multiplicity of parts are to be assembled at an assembly position. A robotic arm moves the multiplicity of parts from the pick-up position to the assembly position. A controller provides timing and controls the movement of the robotic arm. The improvement comprises a rotatable multifaceted turret coupled to the robotic arm. Each facet of the turret includes a member which is arranged and configured to mate with one of the plurality of types of the parts and to temporarily retain the part on the facet. A mechanism for selectively rotating the turret orients each facet of the turret in a predetermined orientation.

The invention can also be characterized as a method for assembling a multiplicity of parts on a workpiece. The multiplicity of parts comprise a plurality of characteristic types. The method comprises the steps of disposing the parts in a pick-up position. The parts are segregated in the pick-up position by the type of the part. Next follows the steps of picking up at least one part of the plurality of types of the parts in the pick-up position with a rotatable multifaceted turret mounted on a robotic arm. The turret is then moved from the pick-up position to an assembly position in a single motion between the two positions. Then the parts on the turret are installed onto the workpiece when in the assembly position.

More particularly the step of picking up at least one of the types of parts comprises in turn the steps of: picking up one of the types of parts on one facet of the rotatable turret when in the pick-up position; rotating the turret while remaining in the pick-up position; and picking up a second one of the types of parts on a second facet of the turret while remaining in the pick-up position.

Simularly, the step of installing the parts on the turret comprises the steps of: installing a first one of the types on one of the facets of the turrets on the workpiece when in the assembly position; rotating the turret to orient a second facet of the turret in a predetermined orientation while remaining in the assembly position, the second facet including the second type of the parts; and installing the second type of the parts on the workpiece while remaining in the assembly position.

Finally, the invention can still further be characterized as an improvement in a method of assembling a multiplicity of parts of a plurality of distinguishable types on to a workpiece comprising the steps of: loading a rotatable multifaceted turret with a multiplicity of parts of the plurality of distinguishable types when in a pick-up position; moving the turret from a pick-up position to an assembly position, the workpiece disposed at the assembly position; installing the multiplicity of parts of the plurality of types on the workpiece when in the assembly position; and moving the turret from the assembly position in a single motion back to the pick-up position.

BRIEF DESCRIPTION OF THE DRAWINGS

FIG. 1 is a simplified plan view of a robot shown astride a keyboard assembly line in combination with five key hoppers.

FIG. 2 is a front perspective view of the robot of FIG. 1 with the key hoppers removed.

FIG. 3 is a partially cut away sectional view of the turret arm of the robot.

FIG. 4 is a cross-sectional view of a portion of the turret arm shown in FIG. 3 and taken through line 4—4.

FIG. 5 is a perspective view of a key cap and key stem shown in enlarged scale.

Figure 6:
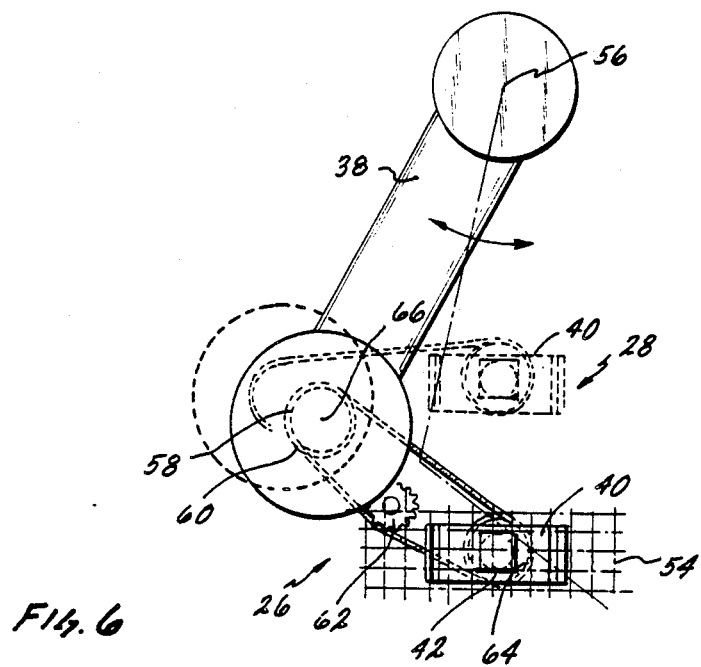
FIG. 6 is a simplified diagrammatic depicting of a portion of the robot arm.

This and other embodiments of the invention can now be better understood by turning to the following detailed description.

DETAILED DESCRIPTION OF THE PREFERRED EMBODIMENTS

The present invention is a robotic system which incorporates a rotating, multiply faceted turret wherein each facet of the turret is arranged and configured to accommodate a different shape or size of sculptured key cap. The rotating turret is coupled to the arm of a programmably controlled robot, which picks up a plurality of distinguishable sculptured key caps from a corresponding plurality of key hoppers. Normally, the turret is thus fully loaded before it leaves the supply area or pickup position wherein the sculptured key caps are available for pick-up. The robotic arm moves the loaded turret to the assembly position wherein the keyboard is positioned. The loaded turret is then moved to the appropriate location over the keyboard, and the turret lowered thereby inserting the key caps on the key stems. The turret is lifted, leaving the key caps in place on the key stems, and is then rotated to expose another facet of the turret toward the keyboard. The arm and turret are simultaneously moved during rotation to a second position over the keyboard, and a second group of keys on a second facet of the turret is inserted on their corresponding stems. The operation continues until each of the keys on each of the loaded facets of the turret have been assembled on the keyboard. The empty turret is then returned to the pick-up position. However, the keyboard has be filled or substantially filled and is moved from the assembly position and a new keyboard put in place. Movement and positioning of the keyboard occurs simultaneously with loading of the turret, thus resulting in additional increases in assembly efficiency. Therefore, the multiply faceted turret executes a single motion from the pick-up position to the assembly position in order to fully or substantially fully assemble a multiplicity of distinctly shaped and sized sculptured keys on a keyboard. In the event, for example, that four or five different types of sculptured key caps are employed on the keyboard, the use of the multiply faceted rotatable turret enables the keyboard to be assembled by a single robot. In the case of five distinct types of sculptured key caps, this ultimately results in an assembly of up to 50 keys in approximately 24 seconds. Even greater speeds can be achieved if desired by expanding the capacity of each turret facet to carry more than five keys.

Turn now to FIG. 1 which is a simplified plan view of the robotic system, generally denoted by reference numeral 10. Illustrated system 10 includes at least five key hoppers, generally referenced by reference numerals 12a–12e. Key hoppers 12a–12b correspond to five distinguishable types of keys used on the keyboard assembled by robotics system 10, and are generally conventional in design. Turning particularly to key hopper 12a, although the detail is not shown, a multiplicity of sculptured key caps of one particular size and shape are delivered through a corresponding shute 14a to a rotating and vibratory hopper mechanism 16a. Ultimately the key caps are oriented in a predetermined orientation and fed single file along a corresponding channel or track 18a. A single key 28 is shown in elevational view in track 18a in FIG. 1, although the entire track 18a is provided with a serial line of such key caps. Similar elements are shown in connection with each of the remaining key hoppers 12b–12e. Ultimately, five keys 20a–20e are positioned in a pick-up position, generally denoted by reference numeral 28, adjacent to robot, generally denoted by reference numeral 22.

A conveyor mechanism, generally denoted by reference numeral 24, is disposed in front of robot 22 and includes an assembly position, generally denoted by reference numeral 26, adjacent to pick-up position 28. Assembly position 26 is shown in plan cut away view in FIG. 1 where the overlying portion of conveyor mechanism 24 has been removed to show a lifting carriage, generally denoted by reference numeral 30, which is described in greater detail in connection with FIG. 7.

In any case, keyboards (not shown) move from the left side of conveyor mechanism 24 to assembly position 26 wherein lifting mechanism 30 stops the keyboard and retains it in assembly position 26. Robot 22, which has picked up key caps 20a–20e on a multiply faceted turret, which will be more fully described in connection with FIGS. 2–6, then moves from pick-up position 28 to assembly position 26. The keys then are installed upon the upwardly extending key stems as better shown in FIGS. 3 and 5. The keyboard, (again not shown in FIG. 1), after having the key caps fully or substantially assembled, is released and allowed to continue to move to the right on conveyor mechanism 24. Robot 22, which is a conventional SCARA type robot, is dc servo-powered and controlled by means of conventional robotic computer controller 32, which is a bank of solenoid operated pneumatic valves selectively connecting an air pressure supply through a corresponding pressure reduction mechanism to robot 22. Robotic computer controller 32 in turn is controlled and driven by conventional main program control circuitry 34 or alternatively by manual control circuitry 36. The circuitry used to command robot 22 is well known to the art and does not directly pertain to the details of the invention. Therefore, no further explanation of the circuitry or robot shall be provided except as necessary to describe the background in which the invention operates.

Robotic system 10 can better be visualized by now turning to the front perspective view of FIG. 2. Robotic system 10 is characterized by an electrically driven robot 22 having a single manipulater arm 38,39. As will be more readily discernible in connection with FIG. 6 robot arm 38,39 is arranged and configured to precisely position a turret mechanism, generally denoted by reference numeral 40, anywhere in an XY plane which includes pick-up position 28 and assembly position 26. Turret assembly 40 can be moved in the Z direction, perpendicular to the XY plane, by virtue of linear displacements of shaft 42. Shaft 42 is coupled to an actuator 44, which in the illustrated embodiment is pneumatically actuated. A controlled air pressure is selectively provided by means of pressure line 46 to actuator 44. Control of the air pressure is achieved through conventional computer controller 32. As will be described below, computer controller 32 provides varying magnitudes of air pressure to actuator 44 to drive shaft 42 downwardly and to thereby insert key caps 20a–20e on to corresponding key stems with a force equal to the expected amount of force required to assemble the corresponding predetermined number of key caps on to their stems.

Turret assembly 40 includes a rotating turret 48 which is rotated by a stepping motor 50. As again will be described in greater detail in connection with FIG. 3, turret 48 is multifaceted and includes within each facet a member with a plurality of key cups or pockets which are arranged and configured to accept a specific size and shape of sculptured key cap. A vacuum line 52 is coupled to turret 48 and communicates with a chamber 88 within turret 48 as will be described below. The vacuum is derived from a conventional vacuum source (not shown).

FIG. 2 shows a keyboard, generally denoted by reference numeral 54, as retained at assembly position 26 by means of lift 30. The obscuring portion of conveyor mechanism 24 has been cut away in the illustration. The plurality of tracks 18a–18e are shown behind conveyor 24 in the illustration of FIG. 2, each track holding its corresponding plurality of keys 20a–20e as appropriate. Turret assembly 40 is variously positioned under programmable control in pick-up position 28 and each facet oriented to pick up a multiple number of keys from one of the tracks 18a–18e. Motor 50 is then actuated to rotate turret 48 thereby exposing another one of the facets of turret 48 to the keys below. Turret 48 is then lowered by means of actuator 44 to the corresponding track and another plurality of distinctly sized or shaped keys are picked up. The process continues until each facet of turret 48 is completely filled. In the illustrated embodiment turret 48 includes five facets with each facet capable of carrying five keys. However, it is to be understood that any number of additional facets and key positions could be accommodated without departing in any substantive way from the teachings and scope of the invention. In the event that the number of facets or key positions are greater than those required to actually assemble the keyboard 54, it is always possible to programmably avoid use of any one or more of the facets of turret 48 or to block any one or more of the key cap positions on one given facet so that the facet will pick up less than its full capacity.

Before considering further detail of turret assembly 40 turn first to the simplified diagrammatic plan view of robot arm 38,39. Robot arm section 38 rotates about a central axis 56. The opposing end of arm section 38 includes a sprocket wheel 58 around which a chain 60 is wrapped. Chain 60 then extends over an idler wheel 62 to a sprocket wheel 64 which rotates about the axis of shaft 42. The chain and sprocket mechanism is utilized to retain turret assembly 40 in a relatively fixed angular orientation within the X and Y plane. Turret assembly 40 is shown in FIG. 6 in solid outline in assembly position 26. Turret assembly 40 moves to pick-up position 28 by rotating clockwise about axis 56 with robot arm 38 and simultaneously rotating about axis 66 robot arm 39. Thus, robot arm 38 makes a clockwise rotation, while robot arm 39 makes a counterclockwise rotation to assume the configuration shown in FIG. 6 in dotted outline. The result is that turret assembly 40 has been linearly moved from assembly position 26 to pick-up position 28 or vice versa by the rotational movements of the jointed arms 38, and 39 of robot 22. Such movements and mechanisms shall not be further detailed but are described here only to complete the background description of the general mechanism and procedure by which turret assembly 40 is precisely positioned in the XY plane.

Return now to FIG. 3 wherein more details of turret assembly 40 and actuator 44 are shown together with their corresponding elements. FIG. 3 is a partially cutaway sectional view showing turret assembly 40 in the assembly position 26 above keyboard 54. Actuator 44 is mounted to second arm 39. Shaft 42 extends from actuator 44 through an adjustable coupling 68. Shaft 44 is retained within one or more bearing members 70 which fix its relative X and Y position with respect to arm 39 but which allow motion in the Z direction. Shaft 42 extends downwardly and terminates in a splined portion 72. Splined portion 72 is mated into a corresponding splined sleeve 74 retained in the lower portion of arm 39. Sprocket wheel 64 is fixed to splined sleeve 74 and thus as sprocket wheel 64 is rotated, the rotary motion is transmitted to splined portion 72 of shaft 42 which rotates within bearing 70 in order to maintain turret assembly 40 in a fixed relative angular orientation as it is moved about the X and Y plane by means of arms 38 and 39 of robot 22.

Turret assembly 40 is comprised of an assembly carriage 76 in which turret 48 is rotatably mounted. Motor 50 is similarly fixed to carriage 76 and is coupled to rotatable turret 48 by means of shaft 78 and coupler 80. Turret 48 in turn is rotatably retained within the carriage 76 by means of end bearings 82.

Multiply faceted turret 48, is hollow and acts as a manifold. Two of the facets, facet 84 and 86, for example, are shown in the cross sectional view of FIG. 3. In the illustrated embodiment one of the five facets of turret 48 is unused, namely facet 86. Therefore facet 86 is not provided with any connecting bores into interior 88 of turret 48 nor with any key cap receiving member. On the other hand, facet 84 has coupled thereto a key cap receiving member 90 which includes key cups or pockets particularly arranged and configured to accept the corresponding key caps to be handled by facet 84. In the illustration of FIG. 3 facet 84 includes a key cap member 90 of resilient material, such as molded silicon or rubber which is particularly arranged and configured to accept key caps 20a. Thus, each facet is dedicated to a predetermined size and shape key cap.

A corresponding plurality of bores 92 are defined through facet 84 and through adjacent key cap member 90 to communicate interior 88 with each pocket adapted to receive a key cap 20a. Chamber 88 is evacuated by means of coupling 94 connected to vacuum hose coupling 96. An appropriate rotatable coupling is provided between vacuum hose coupling 96 and vacuum hose 52 as shown in FIG. 2 to permit rotation of turret 48 without twisting vacuum hose 52.

In any case, actuator 44 is activated to thereby longitudinally extend shaft 42 downwardly when turret assembly 40 has been positioned in a desired X and Y location in assembly position 26. Key caps 20a are then downwardly disposed over corresponding and mating key stems 98. Thus, five key caps are installed with each machine stroke.

Turning briefly to FIG. 5, an underside perspective view in enlarged scale of a key cap, such as key cap 20a, is shown juxtapositioned next to its corresponding key stem 98. Key cap 20a is normally a plastic key cap molded to tightly slip fit over plastic key stem 98. In particular, key cap 20a includes an interior molded receptacle 100 which is connected to and reinforced within key cap 20a. Receptacle 100 includes a mating bore 102 designed to accept and slip fit about the extended end of key stem 98. Because of the close slip fit between key stem 98 and fixture 100, a predetermined amount of force is required to force key cap 20a on to key stem 98. Since a multiple number of key caps are retained within each facet of turret 48, actuator 44 delivers just that amount of force required to completely insert key caps 20a–20e on to the corresponding number of stems 98. Insufficient force would incompletely insert the keys on the key stems while an excessive force may damage the keyboard. Inasmuch as the amount of force required to insert the key caps on to the key stem may vary depending upon the size and shape of the key cap and stem, and upon the number of key caps retained on any facet, the amount of force applied through shaft 42 by actuator 44 is programmed by conventional means and the selected pneumatic pressure is delivered by computer controller 32 shown in FIGS. 1 and 2. This design is largely conventional and is described here only for purposes of fully depicting the environment of the invention. Therefore, it must be understood that an electro-mechanical actuator can be substituted in place of pneumatic actuator 44 and pneumatic computer controller 32. Such electrical actuators are well known to the art and provide a predetermined linear displacement of shaft 42. Therefore, instead of a predetermined force being applied to each key cap and key stem, a predetermined vertical displacement can alternatively be provided, namely just that vertical displacement necessary to completely insert each key cap onto its corresponding stem, largely independent of the force required to do so or the number of keys simultaneously inserted.

Turn now to the partial sectional view of FIG. 4 which illustrates the operation of turret assembly 40 in diagrammatic side view and partial cross section. In the illustrated embodiment of FIG. 4, turret 48 is shown with each facet loaded with a corresponding key cap 20a–20e. Turret 48 is shown in solid outline above a back row of keyboard 54 in a position ready to insert key cap 20d. Turret 48 when correctly positioned in the XY plane is then moved downwardly thereby appropriately slip fitting key caps 20d on to key stems 98 as shown in dotted outline depiction immediately below turret 48 shown in solid outline. Keyboard 55 is diagrammatically depicted as including five rows of keys. After keys 20d have been inserted, turret 48 is moved upwardly. The fixation of key 20d to stem 28 is greater than the force of the vacuum which temporarily retains key 20d within key handling member 104. Thus key 20d is pulled off member 104 as turret 48 moves upwardly. The vacuum provided to chamber 88 is sufficient to retain all the key caps on their corresponding facets regardless of the number of keys removed from other facets. Thus, even if each bore 92 is vented to atmosphere by virtue of the removal of all but one of the covering key caps, sufficient vacuum is still maintained within chamber 88 to retain the last key within its corresponding key handling member 104. Arms 38 and 39 then move turret assembly 40 to the next XY position above keyboard 54. Turret 48 is simultaneously rotated by means of motor 50 to expose another loaded facet to keyboard 54. When in position, shaft 42 (or equivalently splined portion 72) is advanced thereby inserting the next row of key caps on to their respective stems. The cycle is continued until the last row of key caps is inserted such as shown on the right hand side of FIG. 4 in dotted outline.

After turret 48 has been completely stripped of its key caps, it is then moved to the left in the illustration of FIG. 4 from assembly position 26 to pick-up position 28 as shown in dotted outline. When in pick-up position 28, turret 48 is similarly positioned in the XY plane with the appropriate facet of turret 48 positioned over the corresponding track 18a–18e and the assembled key caps 20a–20e. Turret 48 is then lowered into contact with the appropriate key caps, such as key cap 20d as shown in the dotted outline depiction of turret 48 in the left side of FIG. 4. The cap handling member 104 as described is contoured to precisely fit the contour of key cap 20d. Suction provided through member 104 from chamber 88 allows keys cap 20d and each of the other caps to be retained and picked up within their corresponding member. Turret 48 is then raised and moved to the next appropriate XY location within pick-up position 28. Turret 48 is rotated and moved downwardly into contact with the next selected type of key cap. Thus, the next facet is fully loaded and the operational cycle continues until all the desired facets of turret 48 are similarly loaded with corresponding key caps. At this point, turret 48 then moves to the right to insert these key caps on to the next keyboard 34 which has been positioned within assembly position 26 by means better described in connection with FIG. 7.

Figure 7:
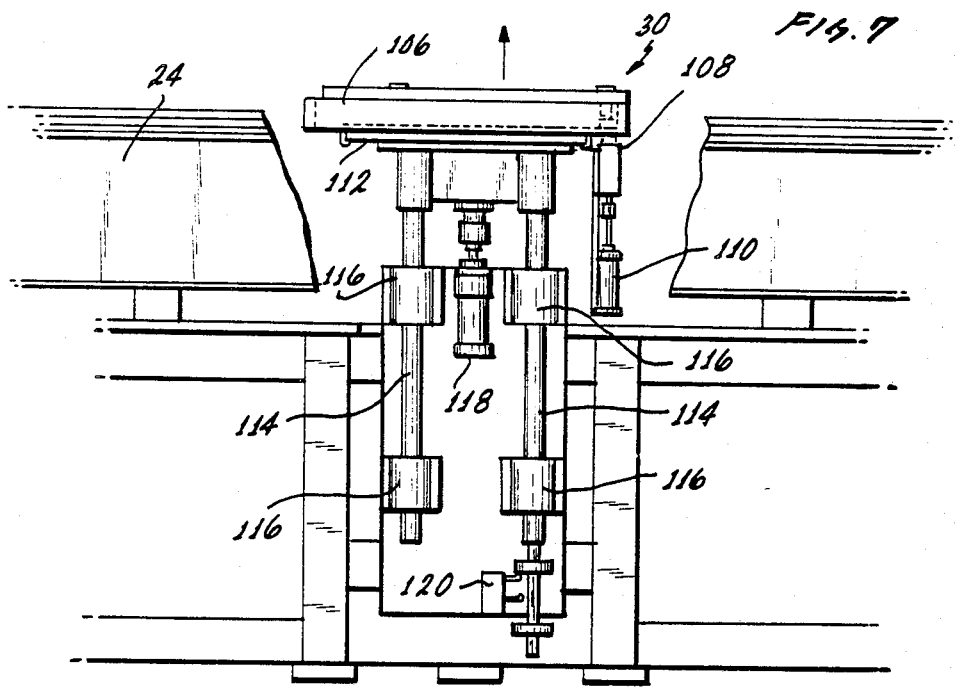
FIG. 7 is a cut away frontal elevational view of the lower portion of the robot disposed beneath the keyboard conveyor.

Turn now to FIG. 7 which shows greater detail of lift mechanism 30 in cut-away view behind conveyor mechanism 24. Lift mechanism 30 is comprised of a keyboard jig 106, shown in FIGS. 2 and 7, which serves to receive and frame keyboard 54 as it is advanced along conveyor 24. Jig 106 picks keyboard 54 up from conveyor 24 after keyboard 54 has been stopped on conveyor 54 by means of an actuated finger 108. Finger 108 is controlled by actuator 110 which moves upwardly through the center of conveyor 24 to provide a means of stopping the forward motion of keyboard 54. Therefore, after keyboard 54 is stopped in position it is lifted by jig 56 which in turn is mounted on a platform 112. Platform 112 is guided by reciprocating stanchion tubes 114 retained within bearings 116. Platform 112 is lifted by means of a conventional actuator 118.

After the keys are installed on the keyboard, actuator 118 allows platform 112 to be dropped thereby realigning the keyboard with conveyor 24. A limit switch 120 mechanically coupled to right stanchion 114 senses the maximum upward and downward motion of platform 112 to provide a cut-off signal for actuator 118. Once the keyboard has been aligned with conveyor 24, and is once again in contact therewith, finger 108 is retracted by means of actuator 110 and the assembled keyboard is allowed to progress down conveyor 24.

The various elements of robotic system 10 now having been described, the general operation of assembly can be fully appreciated. The robotic assembly is programmably controlled by conventional means and utilizes three subroutines. The subroutines include a turret home subroutine, a rotate turret subroutine, and a positional robot arm subroutine. The turret home subroutine is the beginning of each routine cycle. During the turret home subroutine turret, assembly 40 is rotated clockwise to a home position. Thus, a common starting point is provided for each cycle even if a previous cycle was interrupted. In order to increase assembly efficiency, the assembly sequence is programmed to terminate in each case in the home position or at least one rotation to either side to the home position.

The rotate turret subroutine actuates stepping motor 50 to rotate turret 48 by a single index step in a prescribed direction. The number steps and the direction may be programmably specified.

Finally the position robot arm subroutine verifies that turret assembly 40 is in the up position and then sends the XY coordinates to the robot arm. The robot arm rotation is executed during which time rotation of turret 48 is simultaneously executed. The prescribed pressure for assembly is then set, and after the presence or successful pick-up of the key caps is verified by sensing the vacuum load and comparing against the expected vacuum load at the appropriate point during the assembly cycle, turret 48 is then moved downwardly. Pressing times can then be programmably set as nearly instantaneous for pick-up cycles or for periods of predetermined duration, such as 0.1 second, for insertion cycles. Thereafter the turret is raised and pressure to actuator 44 is reset to its normal value.

In summary, the turret home subroutine is first executed in or during the pick-up cycle or insertion cycle to assure that the correct facet is downwardly oriented. Selective rotation of the turret is accomplished by utilizing a rotate turret subroutine. However, a position robot arm subroutine is simulataneously executed which moves the robot arm to the predetermined XY position, sets the pressure for actuator 44, and activates the actuator 44 to advance or retract the turret for such period of time as is appropriate for the pick-up or insertion cycle. Therefore by combination of these three subroutines the entire operation, both pick-up and assembly, can be readily executed with arbitrary flexibility in each application. The master program is created using conventional teach mode techniques characteristic of the robot utilized.

Many modifications and alterations may be made by those having ordinary skill in the art without departing from the scope of the invention. For example, although the illustrated embodiment shows a single pick-up area, and contemplates two trips between the primary pick-up area and the keyboard (to insert up to 50 keys), it is entirely within the scope of the invention that a multiple number of separated pick-up areas could be provided. Additional secondary pick-up areas can be conveniently located adjacent the periphery of the keyboard and pick-up of keys from such additional secondary areas can conveniently be accomodated by picking up key caps from these areas when the turret is adjacent thereto during the insertion phase. Thus, insertion phases may be interpersed with a plurality of pick-up phases with a single trip being performed between any one secondary pick-up area and the keyboard. The illustrated embodiment has been set forth only by way of example and should not be taken as limiting the invention which is defined in the following claims.

I claim:

1. A robotic system for assembling a multiplicity of parts, said multiplicity of parts characterized by a plurality of distinct types, said parts disposed in a pick-up position and assembled in an assembly position spaced apart from said pick-up position, said system comprising:
   a programmable robot with an arm;
   a multifaceted turret, each facet of said turret arranged and configured to manipulate at least one of said plurality of said types of parts;
   means for rotating said turret to selectively orient one of said facets of said turret in a predetermined orientation;
   means for vertically moving said turret; and
   control means coupled to said robotic arm, to said means for rotating and to said means for advancing for controlling each according to a predetermined program,
   whereby said system is capable of assembling a multiplicity of parts of a plurality of types while moving only once between said pick-up position where said parts are picked up and said assembly position where said parts are assembled.

2. The robotic system of claim 1 wherein said multiplicity of parts are sculptured key caps and wherein each facet of said turret is arranged and configured to manipulate one type of sculptured key cap.

3. The robotic system of claim 2 wherein said means for moving said turret advances said turret with a selected force of advance.

4. The robotic system of claim 4 wherein said means for moving said turret is a pneumatic actuator and wherein said control means supplies a selected one of a plurality of pneumatic driving pressures to said pneumatic actuator.

5. The robotic system of claim 4 wherein said turret further comprises a vacuum manifold, each facet on said turret supplied with vacuum for temporarily retaining said parts on said facet of said turret.

6. A improvement in a robotics system for assembling a multiplicity of parts, said multiplicity of parts characterized by a plurality of types, said robotic system including a corresponding plurality of hoppers for arranging said multiplicity of parts of each type in a pick-up position in a predetermined orientation, a conveyor mechanism for transporting and selectively retaining a workpiece to which said multiplicity of parts are to be assembled at an assembly position, a robotic arm for moving said multiplicity of parts from said pick-up position to said assembly position, a controller for timing and controlling movement of said robotic arm, said improvement comprising;
   a rotatable multifaceted turret coupled to said robotic arm, each facet of said turret including a member arranged and configured to mate with one of said plurality of types of said parts and to temporarily retain said part on said facet; and
   means for selectively rotating said turret to orient each facet of said turret in a predetermined orientation,
   whereby a multiplicity of said parts of said plurality types may be temporarily retained on said turret when in said pick-up position, moved to said assembly position and assembled on said workpiece with a single movement of said robotic arm between said pick-up position and assembly position.

7. The improvement of claim 6 wherein said multifaceted rotatable turret further comprises a vacuum manifold, each facet of said turret being provided with a plurality of vacuum ports, said ports within said members applying a suction to each part disposed in said member to temporarily retain said member on said turret.

8. The improvement of claim 6 wherein said parts are key caps and said workpiece a keyboard, said plurality of types of key caps corresponding to distinguishable types of sculptured key caps.

9. The improvement of claim 8 wherein each type of key cap is distinguished by a distinct shape of key cap.

10. The improvement of claim 9 wherein each type of key cap is further distinguished by a distinct size of key cap.

11. A method for assembling a multiplicity of parts on a workpiece, said multiplicity of parts comprised of a plurality of characteristic types, said method comprising the step of:
 disposing said parts in a pick-up position, said parts segregated in said pick-up position by said type of said part;
 picking up at least one part of said plurality of types of said parts in said pick-up position with a rotatable multifaceted turret mounted on a robotic arm;
 moving said turret from said pick-up position to an assembly position in a single motion between said two positions;
 installing said parts on said turret onto said workpiece when in said assembly position,
 whereby robotic assembly time required for assembly of a multiplicity of parts of a plurality of types is substantially decreased.

12. The method of claim 11 where said step of picking up at least one of said types of parts comprises the steps of:
 picking up one of said types of parts on one facet of said rotatable turret when in said pick-up position;
 rotating said turret while remaining in said pick-up position; and
 picking up a second one of said types of parts on a second facet of said turret while remaining in said pick-up position.

13. The method of claim 12 where said step of installing said parts on said turret comprises the steps of:
 installing a first one of said types on one of said facets of said turret on said workpiece when in said assembly position;
 rotating said turret to orient a second facet of said turret in a predetermined orientation while remaining in said assembly position, said second facet including said second type of said parts; and
 installing said second type of said parts on said workpiece while remaining in said assembly position.

14. The method of claim 11 where said step of installing said parts on said turret comprises the steps of:
 installing a first one of said types on one of said facets of said turret on said workpiece when in said assembly position;
 rotating said turret to orient a second facet of said turret in a predetermined orientation while remaining in said assembly position, said second facet including said second type of said parts; and
 installing said second type of said parts on said workpiece while remaining in said assembly position.

15. The method of claim 11 wherein said multiplicity of parts are key caps and said workpiece is a keyboard, said types of key caps being distinct sculptured key caps and where said step of picking up said parts comprises the steps of:
 applying a vacuum to said turret, said turret comprising a vacuum manifold;
 communicating said vacuum through a mating member attached to a corresponding facet of said turret;
 bringing said mating member into mating engagement with a corresponding type of sculptured key cap; and
 applying vacuum through said mating member to said key cap to temporarily retain said sculptured key cap to said mating member.

16. The method of claim 15 where said step of installing said key caps on to said keyboard comprise the steps of:
 selectively orienting a facet of said turret with respect to said keyboard;
 advancing said selected facet towards said keyboard, said keyboard including a corresponding plurality of key stems, said key stems being disposed by said step of advancing into a corresponding key cap temporarily retained within said mating member of said turret, said key stem tightly slip fit into said key cap; and
 retracting said turret from said keyboard, tightness of said slip fit of said key caps breaking suction between said mating member and said key cap thereby removing said key caps from said turret.

17. A improvement in a method of assembling a multiplicity of parts of a plurality of distinguishable types on to a workpiece comprising the steps of:
 loading a rotatable multifaceted turret with a multiplicity of parts of said plurality of distinguishable types when in a pick-up position;
 moving said turret from a pick-up position to an assembly position, said workpiece disposed at said assembly position;
 installing said multiplicity of parts of said plurality of types of said workpiece when in said assembly position; and
 moving said turret from said assembly position in a single motion back to said pick-up position,
 whereby operational cycles of robotic assembly of a multiplicity of parts of a plurality of types is substantially decreased.

18. The improvement of claim 17 where said step of loading said rotatable multifaceted turret comprises the step of loading each facet of said multifaceted turret with a single type of a part.

19. The method of claim 17 where said step of installing comprises the steps of:
 orienting one facet of said multifaceted rotatable turret in a predetermined position;
 simultaneously installing each of said parts on said one facet on to said workpiece;
 rotating said turret to position another facet of said turret in said predetermined position; and
 installing said parts on said other facet on to said workpiece.

20. The method of claim 18 where said step of installing comprises the steps of:
 orienting one facet of said multifaceted rotatable turret in a predetermined position;
 simultaneously installing each of said parts on said one facet on to said workpiece;
 rotating said turret to position another facet of said turret in said predetermined position; and
 installing said parts on said other facet on to said workpiece.

* * * * *